United States Patent Office 3,637,823
Patented Jan. 25, 1972

3,637,823
PREPARATION OF CARONIC ACID FROM DELTA-3-CARENE
Lloyd Berg and James H. Jarrett, Bozeman, Mont., assignors to the United States of America as represented by the Secretary of the Interior
No Drawing. Filed Oct. 20, 1969, Ser. No. 867,942
Int. Cl. C07c 51/32
U.S. Cl. 260—514 P
3 Claims

ABSTRACT OF THE DISCLOSURE

Pure-cis-caronic acid is obtained by oxidizing delta-3-carene with a permanganate in acetone, separating the manganese dioxide and absorbed oxidation products formed in the oxidation reaction from the acetone, slurrying the manganese dioxide and oxidation products in an aqueous medium, removing the manganese dioxide from the aqueous solution by filtration, extracting oxidation products at a pH of 3 from the aqueous solution with ether, extracting cis-caronic acid from the remaining aqueous solution at a pH of 1 and drying the extract solution, and evaporating the ether to form crystals of pure cis-caronic acid.

FIELD OF INVENTION

Cis-caronic acid is a dicarboxylic acid and displays the chemical and physical properties common to dicarboxylic acids as a whole. Consequently cis-caronic acid is useful as a substitute for other dicarboxylic acids such as adipic, suberic, and sebacic in the preparation of polyesters, for the manufacture of polyurethanes and plasticizers, alkyd resins and polyamides such as nylon. For example, a 67 form of nylon can be made by the condensation of hexamethylenediamine with caronic acid.

In view of the many uses for dicarboxylic acids, particularly the higher forms, such as cis-caronic acid, and in view of the great abundance of delta-3-carene in kraft pulping wastes it has become desirable to develop new processes for the preparation of caronic acid.

DESCRIPTION OF PRIOR ART

A method of preparing cis-caronic acid has been reported by Simonsen, in Journal of the Chemical Society, volume 123, page 549 (1923). This method involved the steps of:

(1) Oxidizing delta-3-carene with permanganate in acetone.
(2) Removing the oxidation products from the manganese dioxide resulting from the oxidation reaction by washing with hot water.
(3) Removing the oxidation products from the water wash by extraction with ether.
(4) Preparing the ethyl esters of the mixture of oxidation products.
(5) Separating the esters into five different boiling fractions by vacuum distillation.
(6) Hydrolyzing each fraction from the ester back to the acid.
(7) Collecting cis-caronic acid as one of the acid fractions.

SUMMARY

We have found a new method for preparing cis-caronic acid from delta-3-carene. Basically, the invention involves a conventional oxidation of delta-3-carene with permanganate in acetone, dissolution of the oxidation products absorbed on the manganese dioxide, and a double extraction with ether wherein the first extraction at a pH of about 3 removes primarily oxidation products other than cis-caronic acid followed by an extraction at a pH of about 1 which recovers substantially pure cis-caronic acid.

It is therefore the object of this invention to provide a new and improved method of making cis-caronic acid. Other objects and advantages of the invention will become apparent from a consideration of the following detailed description of the invention.

DESCRIPTION OF THE PREFERRED EMBODIMENTS

In the practice of this invention delta-3-carene is obtained from essential oils or from the waste products resulting from the kraft pulping process. Once obtained, the delta-3-carene represented by the following formula:

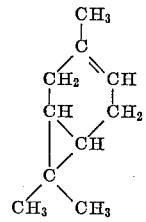

is conventionally oxidized in an acetone reaction medium using a permanganate salt, preferably potassium permanganate, as the oxidizing agent.

Among the products of the oxidation is cis-caronic acid

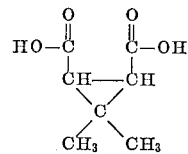

Managanese dioxide is also formed as the permanganate is reduced. The reaction conditions are not critical. Other reaction mediums may be used such as methyl ethyl ketone. The ratio of permanganate of delta-3-carene may vary from 5 to 6 by weight. Generally, the temperature should be in the range of from 10 to 25° C. The preferred range is from 16 to 18. The time of the reaction may vary from 10 to 18 hours.

The oxidation products of the reaction are absorbed on the solid manganese dioxide. Consequently, when the reaction has been allowed to run, the mixture is filtered into an acetone fraction and a filtrate of manganese dioxide having absorbed thereon the reaction products.

This filtrate is then slurried with water to separate the oxidation products from the manganese dioxide. This slurry is then filtered to remove the manganese dioxide. Alternatively, the manganese oxide can be converted to the soluble sulfate form by bubbling sulfur dioxide through the slurry.

The aqueous filtrate is adjusted to a pH of about 3 and extracted once or more with ether. The ether extract is dried with magnesium sulfate and the ether evaporated. This produces a residue which can be used as a recycle as noted below.

The aqueous solution remaining after the ether extraction at pH of 3 is treated with hydrochloric acid to lower the pH to about 1. This solution is then further extracted with ether. The ether extract is dried with magnesium sulfate and evaporated. Upon evaporation cis-caronic acid crystallizes out as a white solid.

Additional cis-caronic acid can be recovered by adjusting the pH of the above mentioned recycle residue to about 4 and extracting with ether and then further acidifying the aqueous residue with hydrochloric acid to a pH of about 1 or less and again extracting with ether. Upon drying the extract and evaporating the ether further cis-caronic acid crystallizes out.

The following examples are illustrative of this invention: Example 1—Thirty-five parts of delta-3-acrene and 217 parts of potassium permanganate were stirred with 3000 parts of acetone maintained at 16° C. for 18 hours. As the oxidation proceeded, manganese dioxide precipitated out. Most of the products of oxidation of the delta-3-carene including the caronic acid are absorbed on the surface of the manganese dioxide. After 18 hours, the slurry was filtered to remove the manganese dioxide plus the absorbed oxidation products. The resulting manganese dioxide was slurried with water in the ratio of one part of manganese dioxide to three parts of water, heated to 95° C. and filtered. This step was repeated until the filtrate became water-white. A total of 30 parts of water were used to wash one part of manganese dioxide.

The amount of aqueous filtrate was reduced to 200 parts by evaporation of water. The pH of the aqueous concentrate was adjusted to 3.0 by adding about 70 parts of concentrated hydrochloric acid and this solution extracted manually four times with a total of 300 parts of ethyl ether. The resulting ether extract was dried by contacting with anhydrous magnesium sulfate. When the ether was removed by evaporation, 28 parts of oxidation products were recovered which contained very little caronic acids.

The pH of the water solution was next adjusted to be less than one by adding concentrated hydrochloric acid and the solution extracted manually with about 300 parts of ether. Upon evaporation of the ether from this extraction twelve parts of oxidation products remained which upon cooling, allowed cis-caronic acid to precipitate out. The twelve parts of oxidation products were dissolved in an equal amount of hot chloroform. On cooling this solution to 20° C., two parts of pure white crystalline cis-caronic acid precipitated out and were recovered by filtration.

Example 2—Forty-one parts of delta-3-carene, 216 parts of potassium permanganate and 3000 parts of acetone were stirred at 16° C. for 18 hours. The resulting manganese dioxide with oxidation products absorbed on its surface was separated by filtration. The manganese dioxide plus oxidation products were slurried with water in the ratio of one part of solid per five parts of water. Gaseous sulfur dioxide was bubbled through this slurry until all of the manganese dioxide had been converted into water soluble manganese sulfate. This aqueous solution was then extracted with ether to yield finally the cis-caronic acid in the same manner as described in Example 1. The final yield of caronic acid was about two parts.

Although the invention has been described with reference to the above description of preferred embodiments and example(s), it will be appreciated by those skilled in the art that many modifications and adaptations of the present process are possible within the spirit and scope of the invention which is defined in the claims below.

What is claimed is:
1. A method for producing cis-caronic acid from delta-3-carene comprising the steps of
   (a) oxidizing delta-3-carene with a permanganate in an organic reaction medium thereby forming a slurry containing manganese dioxide having oxidation products absorbed thereon,
   (b) separating the manganese dioxide from the reaction medium
   (c) mixing the manganese dioxide with an aqueous medium whereby the oxidation products are removed from the manganese dioxide
   (d) separating the manganese dioxide from the aqueous medium
   (e) extracting the oxidation products from the aqueous medium with ether at a pH of about 3
   (f) extracting cis-caronic acid from the remaining aqueous solution at a pH of about 1 and
   (g) drying the extract from step (f), and evaporating the ether to form pure crystals of cis-caronic acid.
2. The method of claim 1 including the further step of evaporating the ether from the extract of step (e) to form a residue adjusting the pH of the residue in aqueous solution to about 4, extracting with ether and passing the remaining aqueous solution to step (f).
3. The method of claim 1 wherein step (d) is eliminated and manganese dioxide of step (c) is converted to the soluble sulfate form by contacting the medium with sulfur dioxide.

References Cited

McCoy et al. J. Am. Chem. Soc. 85 1321 (1963).

Baeyer, Berichte d. Deutsche Chem. besellschapt 29, p. 2796 (1896).

Jarrett, Ph.D. Thesis (1968), Dissertation Abstract only.

Simonsen et al., J. Chem. Soc. 123, 549 (1923).

Fieser et al., Reagents for Chemical Synthesis, pp. 942–943 (1967).

LORRAINE A. WEINBERGER, Primary Examiner

R. GERSTL, Assistant Examiner

U.S. Cl. X.R.

260—22 R, 22 TN, 75 R, 75 TN, 78 R